(12) United States Patent
Harth

(10) Patent No.: US 6,805,984 B2
(45) Date of Patent: Oct. 19, 2004

(54) COOLING FAN SYSTEM FOR A VEHICLE WITH FUEL CELL PROPULSION

(75) Inventor: Klaus-Peter Harth, Flörsheim (DE)

(73) Assignee: General Motors Corporation, Detroit, MI (US)

( * ) Notice: Subject to any disclaimer, the term of this patent is extended or adjusted under 35 U.S.C. 154(b) by 24 days.

(21) Appl. No.: 10/230,876

(22) Filed: Aug. 29, 2002

(65) Prior Publication Data

US 2003/0044661 A1 Mar. 6, 2003

Related U.S. Application Data

(62) Division of application No. 09/943,366, filed on Aug. 29, 2001.

(30) Foreign Application Priority Data

Sep. 22, 2000 (DE) .......................................... 100 47 138

(51) Int. Cl.⁷ ............................................... H01M 8/04
(52) U.S. Cl. .............................. 429/13; 429/22; 429/24; 429/26; 429/17
(58) Field of Search .............................. 429/12, 13, 17, 429/22, 24, 26, 34, 38, 39; 123/41.29, 41.31; 237/12.3 A; 310/58

(56) References Cited

U.S. PATENT DOCUMENTS 4,517,259 A * 5/1985 Lance ........................ 429/26
4,686,157 A 8/1987 Miyake et al. ................. 429/19
5,490,572 A 2/1996 Tajiri et al. ................. 180/65.1
5,856,034 A * 1/1999 Huppmann et al. ........... 429/17
5,961,928 A * 10/1999 Maston et al. ............... 422/110

FOREIGN PATENT DOCUMENTS

| DE | 4412451 | 9/1995 |
| DE | 4412453 | 10/1995 |
| DE | 4425186 | 3/1996 |
| DE | 19548297 | 6/1997 |
| DE | 19652398 | 6/1998 |

OTHER PUBLICATIONS

German Search Report, dated Sep. 6, 2001.

* cited by examiner

*Primary Examiner*—Bruce F. Bell
*Assistant Examiner*—M. Wills
(74) *Attorney, Agent, or Firm*—Cary W. Brooks

(57) ABSTRACT

A cooling fan system for a vehicle with fuel cell propulsion, wherein air is moved by means of a cooling fan for cooling purposes through a heat exchanger and can thereafter be supplied to the environmental air either directly or indirectly after satisfying one or more further cooling tasks, characterized in that an air branching device is provided which supplies at least a part of the air delivered by each fan to a duct and thereby enables the use of the branched-off air for the starting of the fuel cells and/or for the maintenance of the operation of the fuel cells.

5 Claims, 3 Drawing Sheets

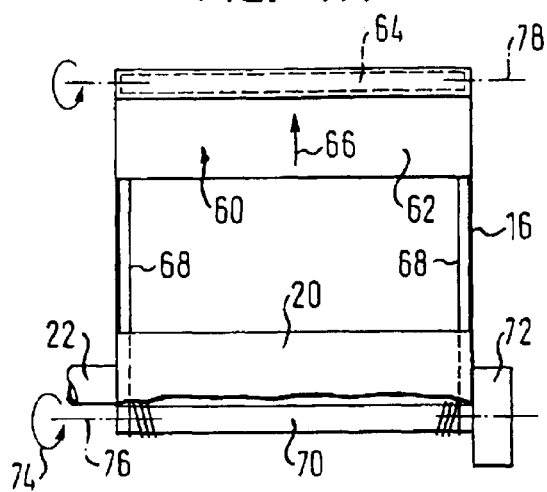
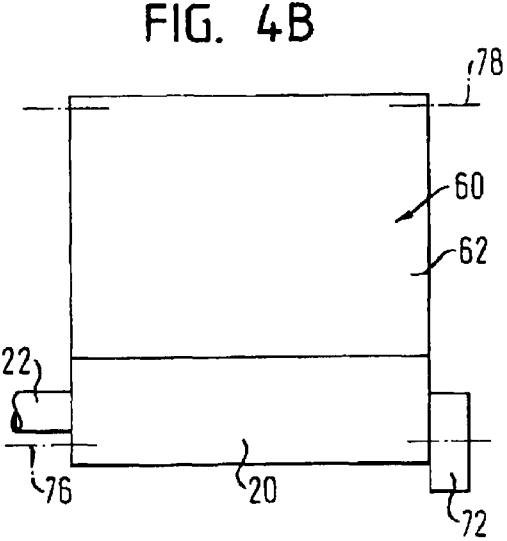
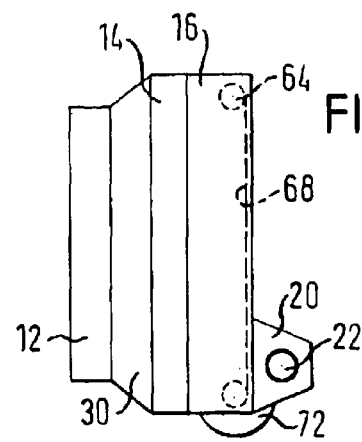
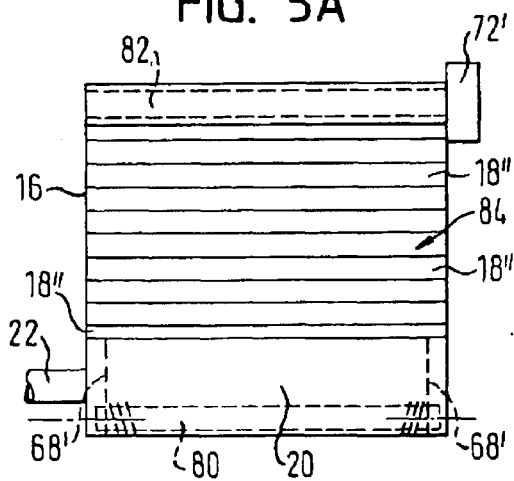
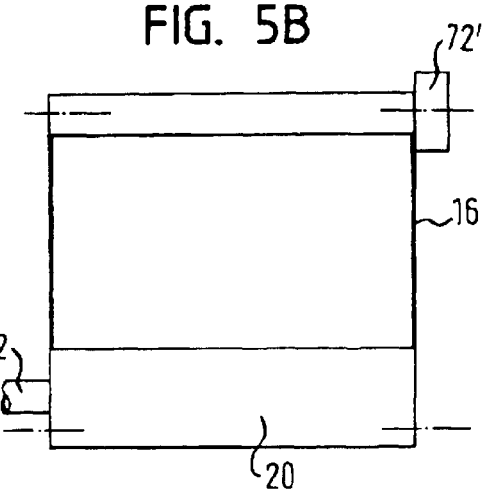

COOLING FAN SYSTEM FOR A VEHICLE WITH FUEL CELL PROPULSION

This is a Division of application Ser. No. 09/943,366 filed Aug. 29, 2001.

TECHNICAL FIELD

The present invention relates to a cooling fan system for a vehicle with fuel cell propulsion, wherein air is moved by means of a cooling fan for cooling purposes through a heat exchanger and can thereafter be supplied to the environmental air either directly or indirectly after satisfying one or more further cooling tasks. The invention relates furthermore to a method for the operation of a fuel cell system.

BACKGROUND OF THE INVENTION

Many proposals have already been made for the equipping of vehicles with fuel cell propulsion systems. Such vehicles are already being constructed and tested.

With such fuel cell propulsion systems, the fuel cells deliver electrical energy which, after appropriate processing, is applied to one or more drive motors which take care of the propulsion of the motor vehicle.

For fuel cell propulsion systems for vehicles, PEM (Proton Exchange Membrane) fuel cells are currently preferred which are connected in parallel and/or in series to one another and form a so-called stack. The fuel cells are supplied, on the one hand, with hydrogen from a suitable source. Protons which originate from the hydrogen and pass through the membranes of the fuel cells combine in the fuel cells with the oxygen of the air which is supplied to form water with the simultaneous generation of electrical energy.

The vehicle can be equipped with a hydrogen storage tank, and may, however, also be fed with a synthesized hydrogen-rich gas which is obtained from a hydrocarbon such as methanol. In this case, the hydrocarbon is processed in a processing device in the form of a so-called reformer to form the synthesized hydrogen-rich gas. When a reformer is used, it also requires air.

Fuel cells are also known which are directly fed with methanol, with the methanol consisting of up to 97% water. Such fuel cell systems require oxygen for the power generating reaction and must be supplied with air by a compressor.

Independently of the type of fuel cells which are used, a compressor is always required which makes available the compressed air for the fuel cells or for the reformer. Part of the output power of the fuel cell system is also applied to an electric motor which is required in operation to drive the compressor.

In practice, problems arise with the starting of a fuel cell system.

One known solution involves the use of a traction battery with, for example, 288 V operating potential. This traction battery has in principle three different tasks:

On the one hand, it is used to drive the main compressor in order to feed air compressed by this compressor into the fuel cell system, so that power is generated which then replaces the traction battery as the power source for the electric motor driving the compressor.

The second task of the traction battery is to assist dynamically the electric motor or electric motors which propel the vehicle so that, for example, with fast acceleration or at elevated speeds, the power of the traction battery supplements the electrical output power of the fuel cell system.

The third task lies in the fact that a traction battery can be used in order to realize regenerative braking for example. That is to say, on braking of the vehicle, the kinetic energy which is present is partly converted into electrical energy which can then be stored in the traction battery.

Although a traction battery can be useful for these different purposes, it represents an expensive and heavy component, so that one would be pleased to dispense with it. If, however, the traction battery is dispensed with, it could no longer be used to start up the fuel cell system.

For the starting of the fuel cell system, air is required. The air compressor is normally driven from the fuel cell potential; however, this is not yet available. In the absence of a traction battery, it has already been proposed to supply the fuel cell system with sufficient air by means of a 12 V auxiliary fan, i.e., a so-called start-up blower, so that the power generation starts there and the system can be gradually run up until the power generation by the fuel cell system is sufficient in order to maintain the system in operation.

Irrespective of whether one operates with a traction battery or with an auxiliary blower, many components which make the system more complicated or more expensive, such as fans, radiators, pipes, 288 V batteries, etc., are necessary which one would prefer to do without.

SUMMARY OF THE INVENTION

The object of the present invention is to make sufficient air available so that the fuel cell system can be started and run up without using a traction battery or an auxiliary fan.

In order to satisfy this object, provision is made, in accordance with the invention, for an air branching device to be provided which supplies at least a part of the air delivered by each fan to a duct and thereby enables the use of the branched-off air for the starting of the fuel cells and/or for the maintenance of the operation of the fuel cells.

In other words, it has been recognized, in accordance with the invention, when using a fuel cell propulsion system in which a cooling fan driven by the normal onboard battery is used for the cooling of liquid flowing through a heat exchanger, with the throughflowing air also being capable of being used for further cooling tasks, that the system consisting of the cooling fan and heat exchanger is unnecessary per se during the starting of the fuel cell system, since the heat which then arises is restricted, and that the cooling fan associated with the heat exchanger can thus be exploited for the starting of the fuel cell system until the fuel cell system delivers sufficient power to drive the compressor itself. That is to say, the cooling fan is used in the short term for the starting of the fuel cell system.

This can in principle take place in such a way that an air branching device, which is simply formed by a fixed guide wall, is provided and always branches off a part of the air flow produced by the cooling fan and supplies it via a suitable line to the fuel cells and/or to a reformer. On operation of the system, a device must then be provided in order to close off the duct when the compressor starts to run in order to prevent the compressed air generated by the compressor from escaping through the corresponding duct in the form of a reverse flow. This need could indeed be avoided if the branched-off air flow generated by the cooling fan is supplied to the inlet of the compressor and thus via the compressor to the fuel cells and/or the reformer.

A further possibility is to make the air branching device movable so that it can be switched between a first substantially inactive position and a second position which brings about the branching off of the air. In this manner it is not only possible to use part of the air flow delivered by the cooling fan, but rather the entire air flow can be used for the starting of the fuel cell system.

The cooling fan can in principle be a suction fan which is arranged downstream of the heat exchanger and sucks the air through the latter, with the air branching device then being arranged downstream of the suction fan. Such suction fans are customary with fuel cell propulsion systems.

It is, however, more favorable if each cooling fan is a pusher fan which is arranged in front of the heat exchanger. A fan of this kind is better able to deliver the airflow required for the starting of the fuel cells because it operates more efficiently under backpressure conditions.

When using a pusher fan, it is preferably connected to the heat exchanger by means of a housing which avoids air losses.

It is particularly favorable when an air guiding housing is arranged downstream of the heat exchanger directly adjacent to the latter so that all the air flowing through the heat exchanger enters into the air guiding housing.

Various possibilities exist in accordance with the invention in order to realize the air branching device. This can, in particular, be realized by adjustable plates, which, in a first position, permit the air moving through the heat exchanger to pass and, in a second position, close against one another in order to supply the air to the duct leading to the fuel cells. The plates are preferably arranged at the downstream side of the air guiding housing.

They can, for example, be arranged in the manner of a louver window. Another possibility is to arrange them in the manner of an iris diaphragm, with the plates forming a central opening in the state closed against one another, which lies opposite to the entry to the duct leading to the fuel cells.

The possibility also exists of arranging the plates in the manner of a roller shutter.

It is particularly favorable when an air collecting box extends over a region of the air guiding housing which is not covered over by the air branching device in the air branching-off position and collects the air deflected by the air branching device and directs it to the duct leading to the fuel cells. An air collecting box of this kind can be straightforwardly used with an air branching device consisting of plates, in particular if these are arranged in the manner of a louver window (Venetian blind) or in the manner of a roller shutter, since the air collecting box extends over the entire width of the heat exchanger and the plates can close against an edge region of the air collecting box.

A further possibility for realizing the air branching device and to use it with an air collecting box is to form the air branching device as a roller blind.

Instead of using an air collecting box, the air branching device can in the second position fully close off the air outlet side of the air guiding housing and the latter can have a connection for a duct leading to the fuel cells. In this way, the need to use a separate air collecting box is avoided, i.e., the air guiding housing, which is in any event present, is itself used as the air collecting box.

With embodiments utilizing an adjustable air branching device, the positioning motor for the positioning of the same is preferably mounted on the air guiding housing.

An air filter can be built into the air collecting box or into the duct leading to the fuel cells in order to ensure that the fuel cells and/or the reformer are only fed with clean air.

It is particularly favorable that in the invention the cooling system consisting of the cooling fan and the heat exchanger with the air branching device and the housings associated therewith, as well as any motor for the positioning of the air branching device, can be built up as a module, since it can then be designed in a space-saving manner as a unit which is easily exchangeable and which can be manufactured at favorable cost with a minimum of additional parts.

Finally, there is provided, in accordance with the invention, a method for the operation of a fuel cell system comprising a heat exchanger with at least one fan which produces a cooling air flow through the heat exchanger and with the a fuel cell arrangement fed with compressed air from a compressor, characterized in that at least a part of the cooling air flow is supplied to the fuel cell arrangement, and optionally to a reforming device connected in front of the fuel cell arrangement, for the starting of the fuel cell system and/or for the maintenance of operation in low load ranges, for example, during idling, during loss of speed by rolling or during overrun operation.

BRIEF DESCRIPTION OF THE DRAWINGS

The invention will be explained in more detail in the following with reference to embodiments and to the drawings in which:

FIG. 4A shows an end view of a further cooling fan module in accordance with the invention seen from the downstream side with an air branching device in the form of a roller blind in a partly open state;

FIG. 4B shows a representation similar to FIG. 4A, but with the roller blind in the second closed position in which branching off of air takes place;

FIG. 4C shows a side view of the cooling fan module of FIGS. 4A and 4B;

FIG. 5A shows an end view of a further variant of a cooling fan module in accordance with the invention at the downstream side with an air branching device in the form of a roller shutter being used and being shown here in the closed state; and FIG. 5B shows a representation similar to FIG. 5A, but in the first open operating state of the roller shutter.

DESCRIPTION OF THE PREFERRED EMBODIMENTS

Figure 1A:
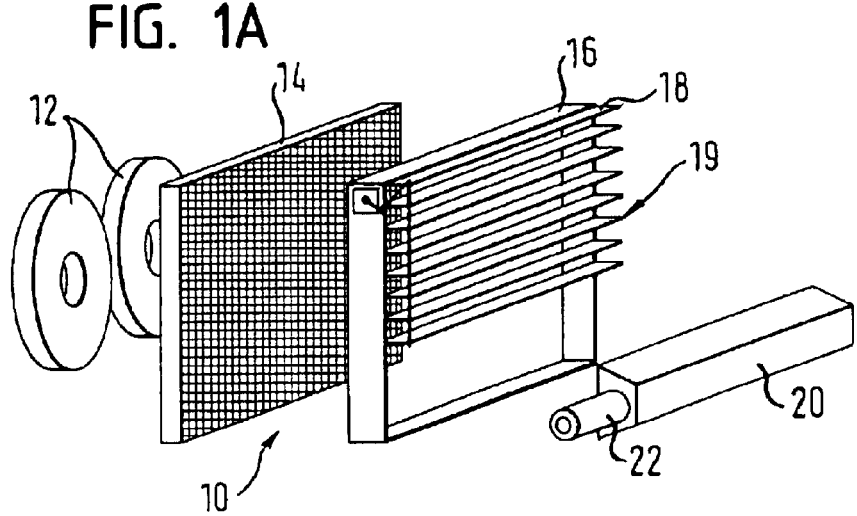
FIG. 1A shows an exploded illustration of a cooling fan module in accordance with the invention for a vehicle.

FIG. 1A shows in a perspective, highly schematic representation a cooling fan module 10 consisting of two pusher fans 12 which press air through a heat exchanger 14 in order to cool a liquid, which is not shown but which flows through the heat exchanger 14.

An air guiding housing 16, here in the form of a rectangular box, carries a plurality of pivotally hinged plates 18 in the form of a louver window and covered over in the lower region by an air collecting box 20, with the air collecting box 20 opening into a duct 22 which, in accordance with FIG. 2, leads directly or indirectly to the fuel cells, as will be explained in more detail later. The plates 18 form an air branching device 19.

Figure 1B:
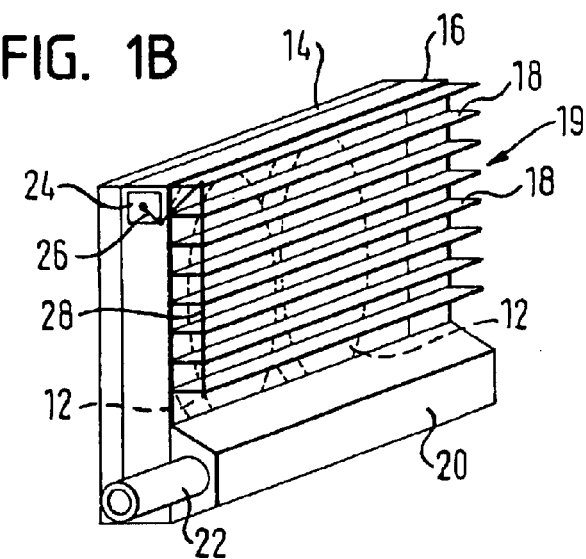
FIG. 1B shows a perspective illustration of the assembled module of FIG. 1A in which the air branching device is located in a first operating position in which no pronounced branching off of air takes place.

FIG. 1B shows the module of FIG. 1A in the assembled state, and it can be recognized that this is a compact, space-saving design. At the upper left-hand side of the air guiding housing, which is formed as a frame, there is a positioning motor 24 which is connected to the individual plates 18 via a lever arm 26 and connecting rod 28 and which can move or pivot the plates from a first open operating position, in accordance with FIG. 1B, in which at least substantially no branching off of air takes place, into a second closed position shown in FIG. 1C in which the individual plates 18 close in an air-tight manner against one another and against the air guiding housing 16, so that the air delivered by the fans 12 is forced to flow into the air collecting box 20 and this air passes from there via the duct 22 to the fuel cells.

In a simplified embodiment, the plates 18 and the motor 24 are omitted and the wall of the air collecting box forms a fixedly disposed guide wall forming the air branching device. A plurality of different embodiments with fixedly arranged guide walls can also be considered.

Figure 1C:
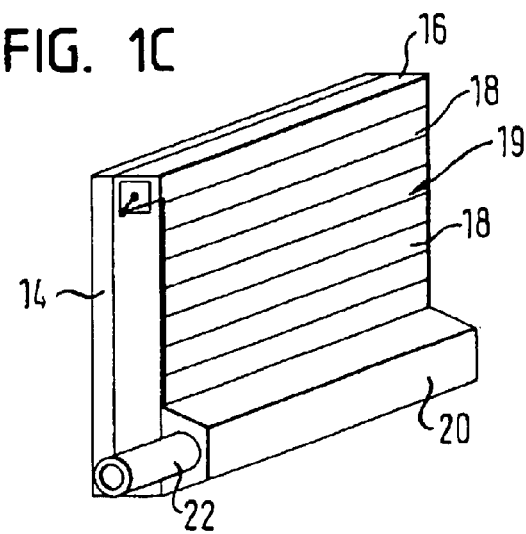
FIG. 1C corresponds to FIG. 1B but shows the air branching device in a second position in which air is branched off.
Figure 2:
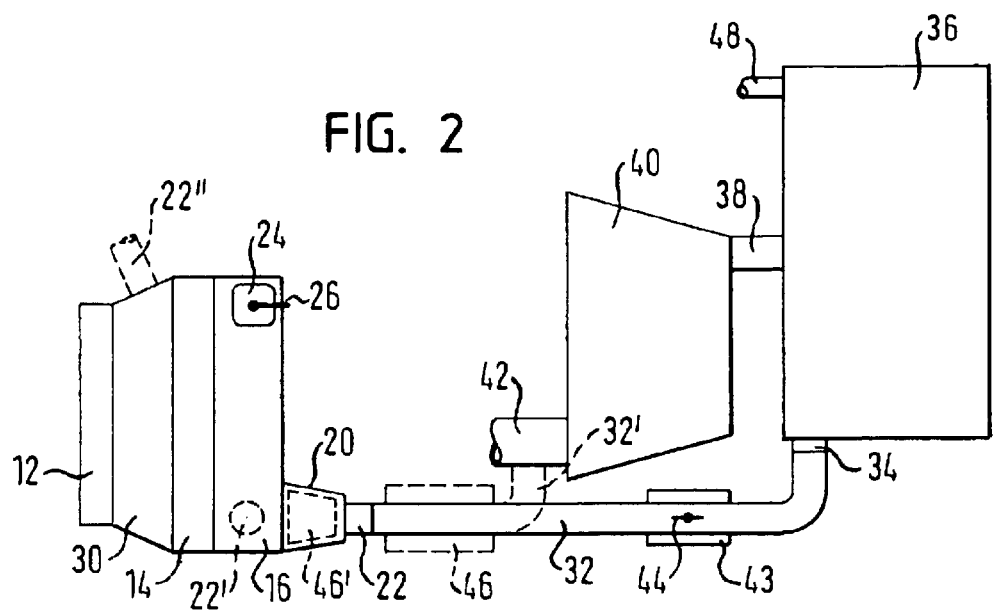
FIG. 2 shows a schematic side view of the module of FIG. 1C in a slightly modified form and connected to a fuel cell system.

FIG. 2 shows essentially the same design of the cooling fan module of the invention as in FIGS. 1A–1C, but with some differences. First of all, FIG. 2 makes it clear that the two cooling fans 12 are connected to the heat exchanger 14 via a housing 30, so that the total quantity of air which is conveyed by the pusher fans 12 has to flow through the heat exchanger 14. In this example, the outlet 22 of the air collecting box 20 is led out at the rear of the air collecting box and not at the side as in the example of FIG. 1. The outlet 22 leads into a duct 32 which leads to an air inlet 34 of the fuel cell arrangement 36. Within the fuel cell arrangement 36 there is in known manner an air distribution passage to which both the air inlet 34 and the air inlet 38, which is connected to the outlet of the air compressor 40, lead.

In the normal operation of the fuel cell arrangement, the compressor 40 sucks in air via the inlet 42, with an air filter, for example, being positioned upstream of the inlet 42, compresses the air and then delivers it as compressed air via the inlet 38 to the fuel cell arrangement 36.

In order to avoid an undesired reverse flow via the duct 32 on operation of the compressor 40, the duct 32 is provided with a valve flap 44 controllable by a control 42. The valve flap 44 shown in the open position in FIG. 2 can, however, be moved via the control 42 into a closed position in order to prevent the aforementioned reverse flow.

A correspondingly controllable valve flap can also be arranged in the region of the air inlet 38 or of the inlet 42 in order to prevent air escaping via the compressor 40 when the fuel cell arrangement is fed by the pushed fans 12.

The valve flap 44 can be omitted when the duct is led, as indicated by 32', into the air induction pipe 42 of the compressor. The air inlet 34 of the fuel cell arrangement 36 is then superfluous. It is, however, eventually necessary to provide a valve in the region of the air induction tube 42 upstream of the mouth of the line 32' in order to avoid an undesired loss of air here when operating the pusher fan prior to taking the compressor into operation.

The reference numeral 46 indicates an air filter which in this example is arranged in the duct 32. As an alternative, an air filter 46' could be accommodated in the air collecting box 20.

On starting a vehicle with the fuel cell system of FIG. 2, the motor 24 is first energized in order to close the louver plates 18, i.e., to bring them into the position of FIG. 1C. At the same time the valve 44, if present, is opened and the pusher fans 12 operated by the low voltage onboard battery are switched on so that the compressed air produced by the pusher fans 12 passes via the housing 30, the heat exchanger 14, the air guiding housing 16, and the air collecting box 20 into the duct 32 and thus to the fuel cells 36. Should the duct be lead into the compressor inlet, as shown at 32', the compressed air passes from the pusher fans via the compressor 40 into the fuel cell arrangement 36. At the same time, hydrogen or a synthesized hydrogen-rich gas is supplied to the fuel cell arrangement 36 via the hydrogen inlet 48. The fuel cell arrangement 36 then starts to produce power.

As soon as the quantity of power which is generated is sufficient to drive the motor (not shown) which drives the compressor 40, this motor is set operating. The compressor 40 then delivers the required quantity of air in order to keep the fuel cell arrangement 36 operating and to produce the necessary power.

As soon as the compressor 40 delivers sufficient air to the fuel cell arrangement 36, the motor 24 can be controlled in order to bring the louver plates 18 into the open position of FIG. 1B. The valve flap can be brought into a position in which it closes the duct 32, so that no air losses arise due to reverse flow via the duct 32. Instead of using an electrically controlled valve, i.e., instead of using a valve flap, this can also be designed as a non-return valve. This also applies to a valve which may possibly be provided in the region of the inlet 38 or in the air supply to the compressor 40, in order to avoid air losses on feeding the fuel cell arrangement 36 by the pusher fans 12.

Although an air collecting box is used in the embodiments of FIGS. 1 and 2, one can dispense with such an air collecting box. Instead of this, the air outlet 22 can be led directly out of the air guiding housing 16 or out of the housing 30. The louver plates 18 or other branching off devices must then cover over the entire outlet side of the air guiding housing 16 or of the heat exchanger. When the air outlet is led out of the housing 30, the branching off device could be arranged in front of the heat exchanger and fully cover over its inlet side.

These further possibilities of placement of the air outlet are indicated in FIG. 2 by 22' and 22".

Figures 3A, 3B:
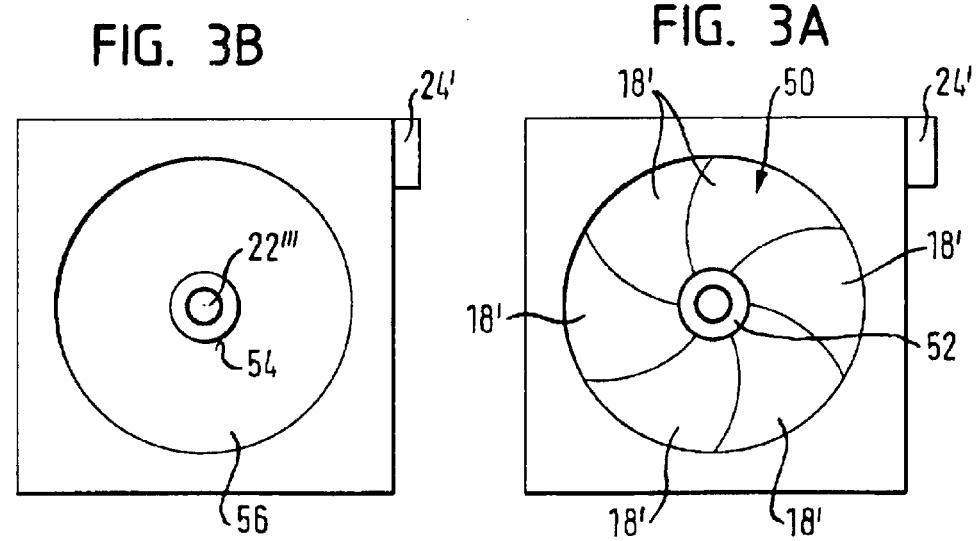
FIG. 3A shows an end view of a further cooling fan module in accordance with the invention with an air branching device in the form of an iris diaphragm in the closed, air branching position.
FIG. 3B shows a representation similar to FIG. 3A but with the air branching device in the first, open position in which no branching off of air takes place.
Figure 3C:
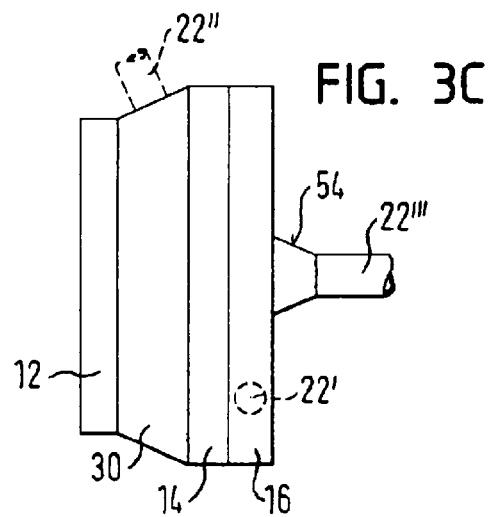
FIG. 3C shows a side view of the embodiment of FIGS. 3A and 3B.

FIGS. 3A–3C show an alternative form of the air branching device. In this example, the air branching device 50 again consists of plate 18'. These are, however, arranged in the manner of an iris diaphragm. FIG. 3A shows the closed position of the iris diaphragm. One notes that the radially inner ends of the plates 18' form an open circular orifice 52 which lies opposite to the inlet of an air collecting cone 54 (FIG. 3B) provided with an outlet 22'''. The iris diaphragm is so designed that the radially inner ends of the plates 18' directly sealingly contact the air collecting cone 54 directly adjacent to the opening, so that the compressed air produced by the pusher fans 12 is collected by the air collecting housing 16 and forced into the air collecting cone 54 from which it passes via the air outlet 22''' into a duct such as 32 or 32'.

FIG. 3B shows the fully-open position of the iris diaphragm which bounds a circular, ring-shaped air outlet 56 for the air which passes through the heat exchanger 14. In this example, it can be advantageous to operate with only one circular pusher fan 12. In this example, the plates 18' are moved by the motor 24' between the positions of FIGS. 3A and 3B. In a modified variant, the plates 18' of the iris diaphragm could close completely and an air outlet 22' or 22" could be provided as in the embodiment of FIG. 2.

FIG. 4 shows an alternative embodiment in which an air branching device in the form of a roller blind 60 is used at the outlet side of the air guiding housing 16. This roller blind 60 is a flexible, impermeable membrane 62 which can be rolled up onto an upper spring-loaded cylinder 64, with the spring loading being so designed that it endeavors to move the roller blind in the direction of the arrow 66 into a fully-open position. At the lower side of the roller blind 60 in FIG. 4A there are two cables 68 which can be rolled up onto a cylinder 70 in the lower region of the air guiding housing 16, the cylinder 70 being driveable by a motor 72.

The motor 72 can unwind the roller blind 60 from the upper spring-loaded cylinder 64 by rotation of the cylinder 70 around the axis 76 in accordance with the arrow 74, with the cylinder 64 being rotatably arranged about its longitudinal axis 78.

FIG. 4A shows an intermediate position in which the lower edge of the roller blind 60 has started to cover over the air outlet side of the air guiding housing, whereas FIG. 4B shows the fully-closed position.

The motor 72 is used in order to bring the roller blinds 60 downwardly into the closed position of FIG. 4B, where the blind can be held by a non-illustrated latch, for example by a pin, which is actuated by a solenoid. As soon as the fuel cell arrangement produces sufficient power in order to drive the compressor 40, the latch is released, for example by interrupting the supply of current to the solenoid, and the spring-loaded cylinder 64 then serves to wind up the roller blind so that this moves back into the fully-open position (not shown).

FIGS. 5A and 5B show a similar arrangement except that here an air branching device 84 is used with plates 18' in the form of a roller shutter. In this example, the roller shutter is drawn downwardly via cables 68' by a spring-loaded cylinder 80 in order to attain the closed position of FIG. 5A in which the lowermost plate 18" sealingly closes against the lower edge of the air collecting box 20. For the opening of the roller shutter, the motor 72 is energized. It then turns the cylinder 82 which rolls up the plates until the fully-open position of FIG. 5B is reached. The roller shutter can then be held in this position by a non-illustrated latch, so that the motor 72 does not need to be permanently energized.

Although the device of the invention is primarily used for the starting up of the fuel cell system, it could, under some circumstances, be used when it is only necessary to maintain the operation of the fuel cells, so that the vehicle can immediately start again when operating in a low load region, for example, during idling at a traffic light, in overrun operation or when loosing speed by rolling. The possibility of switching off the motor for the compressor in these operating phases can contribute to noise reduction.

What is claimed is:

1. A method for the operation of a fuel cell system comprising a plurality of fuel cells, a heat exchanger, at least one cooling fan adapted to produce a cooling air flow directed through the heat exchanger and an air compressor for feeding compressed air to said fuel cells, wherein, at least a part of said cooling air is supplied to said fuel cells for the purpose of at least one of:

starting the fuel cells;

maintaining the operation of such fuel cells in a low load range during idling;

maintaining the operation of said fuel cells in a low load range during loss of speed by rolling; and, maintaining said fuel cells operating in a low load range during overrun operation; and wherein said heat exchanger is position adjacent said cooling fan, and flowing air produced by said cooling fan first through said heat exchanger and, thereafter, into said fuel cells.

2. A method in accordance with claim 1 wherein, at least a part of said cooling air flow is also supplied to a reforming device connected to the front of said fuel cells.

3. A method as set forth in claim 1, wherein, the starting or maintaining are initiated without operating an air compressor, and when power generated by the fuel cells has reached a predetermined amount, thereafter, operating the air compressor using power generated by the fuel cells.

4. A method as set forth in claim 1, wherein, the starting or maintaining are initiated without operating an air compressor and, after the power generated by the fuel cells has reached a predetermined amount, operating the air compressor using the power generated by the fuel cells without the use of battery power.

5. A method as set forth in claim 1, wherein, the starting or maintaining are initiated without the use of a 288-volt battery.

* * * * *